United States Patent
Matsuda et al.

(10) Patent No.: US 6,256,273 B1
(45) Date of Patent: Jul. 3, 2001

(54) FOCUSING CONTROL APPARATUS FOR OPTIMALLY DIRECTING LIGHT ONTO A RECORDING SURFACE

(75) Inventors: Norio Matsuda; Hiroyuki Abe; Shinichi Naohara; Hitoshi Yamazaki; Takashi Suzuki; Yuichi Kimikawa; Kenichi Takahashi, all of Kawagoe (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/111,435

(22) Filed: Jul. 7, 1998

(30) Foreign Application Priority Data

Jul. 10, 1997 (JP) .................................................. 9-184738

(51) Int. Cl.$^7$ ....................................................... G11B 7/00
(52) U.S. Cl. ..................................... 369/44.27; 369/53.15
(58) Field of Search ............................. 369/44.27, 44.29, 369/44.32, 53.15, 53.23

(56) References Cited

U.S. PATENT DOCUMENTS

| | | | |
|---|---|---|---|
| 4,736,354 | * 4/1988 | Yoshio | 369/44.34 X |
| 4,998,233 | * 3/1991 | DiMatteo et al. | 369/44.27 X |
| 5,189,293 | * 2/1993 | Leenknegt | 369/44.27 X |
| 5,793,721 | * 8/1998 | Akkermans | 369/44.29 X |
| 5,966,355 | * 10/1999 | Kamiyama | 369/44.27 OR |

\* cited by examiner

Primary Examiner—Aristotelis M. Psitos
(74) Attorney, Agent, or Firm—Perman & Green, LLP

(57) ABSTRACT

A focusing control apparatus is designed to perform a focus jumping operation successfully. The apparatus has reading device which irradiates read light to a recording medium 1 having information recording surfaces formed on at least two layers, respectively, receiving return light of the read light from the recording medium, and generating a read signal; and control device which executes a focus jumping process to generate a drive signal of a focusing actuator to move an optimum light converging position of the read light from one of the recording surfaces to the other based on a focusing error signal that is generated based on the return light. The apparatus further has drop-out detecting device which detects a drop-out of the read signal and vibration detecting device which detects a vibration of the recording medium or reading device. The control device executes the focus jumping process only when the drop-out is not detected and a vibration detection level of the vibration detecting means is lower than a predetermined value.

2 Claims, 11 Drawing Sheets

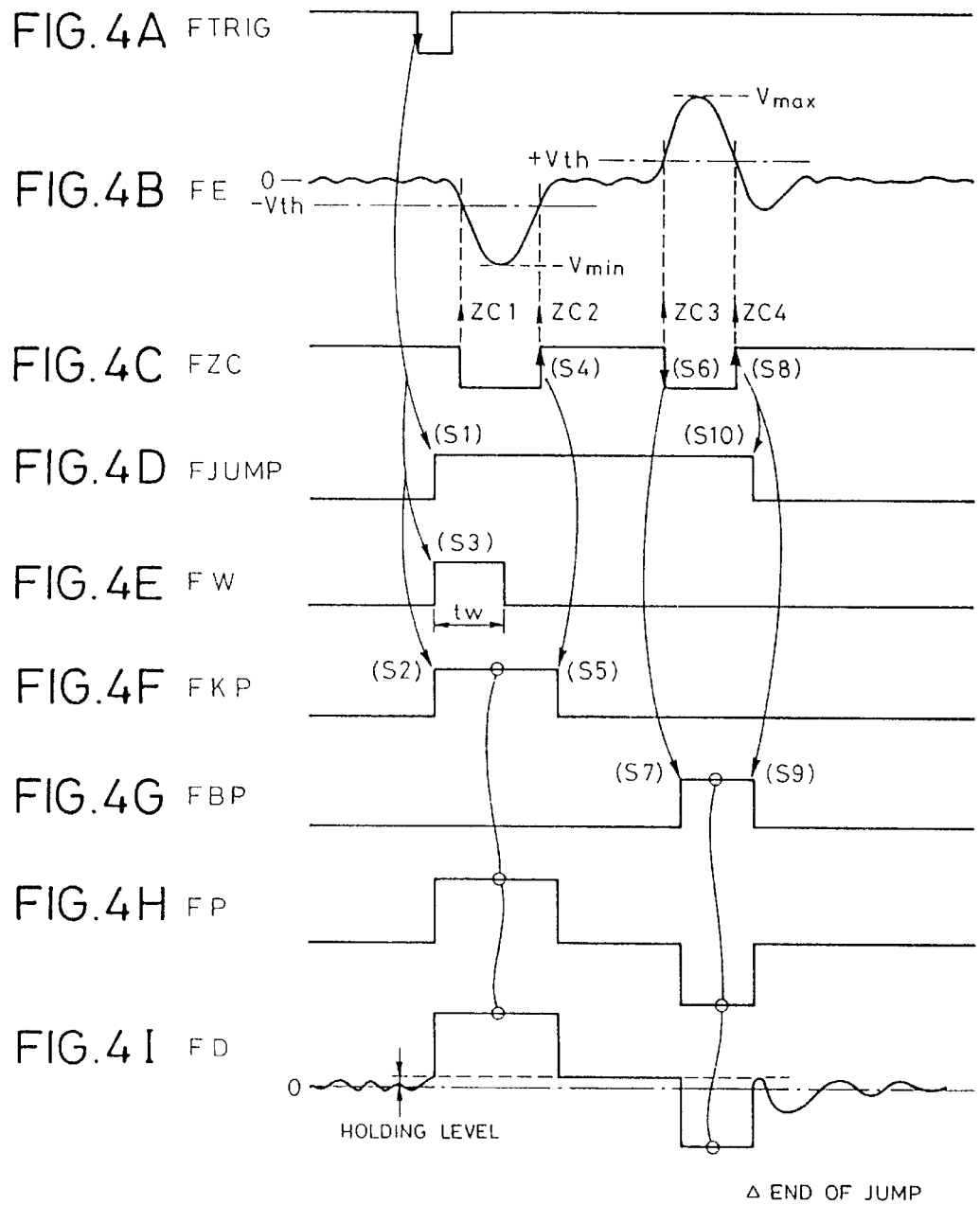

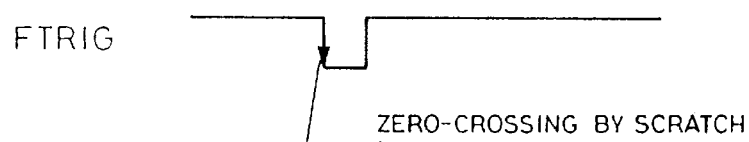
FIG.5A FTRIG
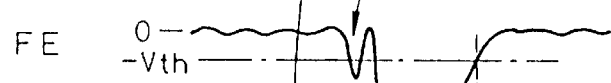
FIG.5B FE
ZERO-CROSSING BY SCRATCH
FIG.5C FZC
FIG.5D FJUMP
FIG.5E FKP
FIG.5F FBP
FIG.5G FP
FIG.5H FD
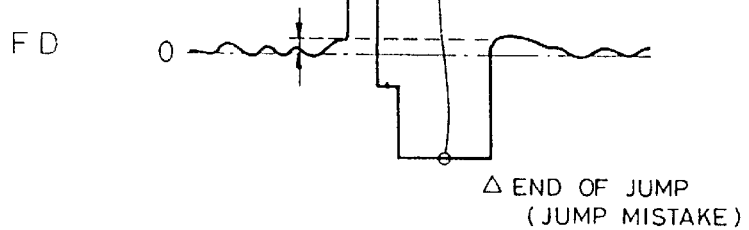
△ END OF JUMP
(JUMP MISTAKE)

FIG. 8
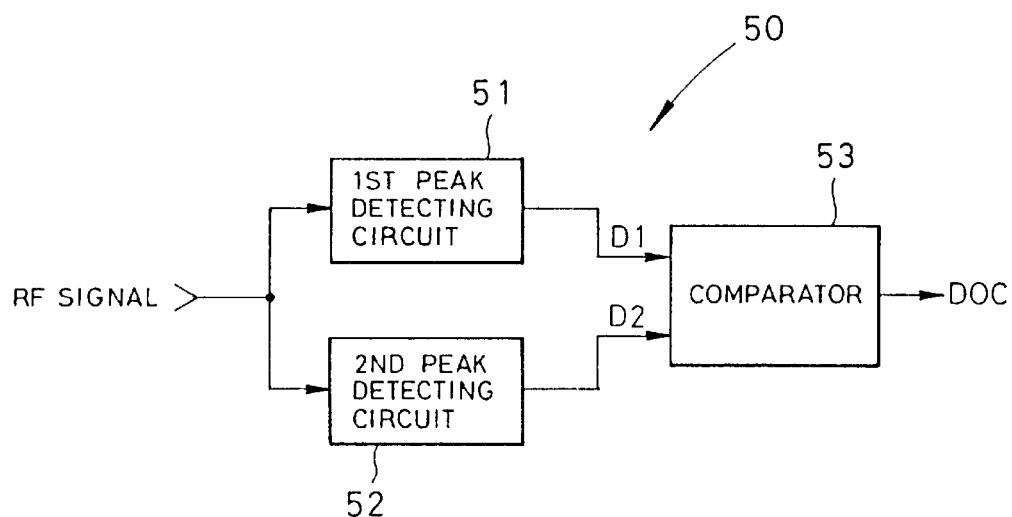
FIG. 9A
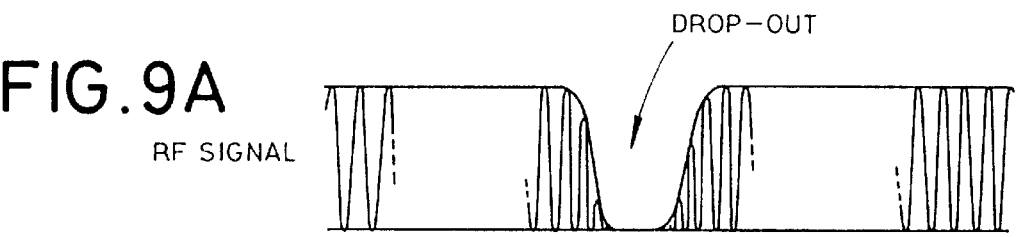
FIG. 9B
FIG. 9C
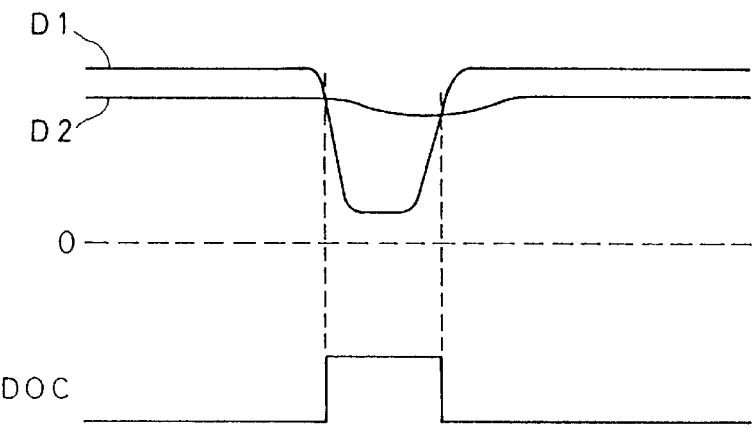

FOCUSING CONTROL APPARATUS FOR OPTIMALLY DIRECTING LIGHT ONTO A RECORDING SURFACE

BACKGROUND OF THE INVENTION

1. Field of the Invention

The present invention relates to a focusing control apparatus and, more particularly, to a focusing control apparatus which performs a control operation to attain an optimum light converging position of read light that is irradiated onto a predetermined recording surface of a recording medium, with regard to the recording surface.

2. Description of Related Art

Nowadays, an information recording medium of high recording density and large capacity called "digital video disc or digital versatile disc (abbreviation: DVD)" and systems using the medium are used widely. The disc includes a type having information recording surfaces formed on upper and lower two layers sandwiching an interlayer part (spacer or space region). When data is read by an optical pickup from one of the disc surface sides of the disc of such a type, a focal point (focal position or optimum light converging position) of read light has to be formed on the information recording surface of a desired one of the layers.

Usually, a focus jumping operation for moving a focal point of read light from an information recording surface of one of the layers to an information recording surface of the other layer is executed based on the detection of a zero-crossing point of a focusing error signal that is generated based on an output signal of a pickup.

Specifically, the pickup has a focusing actuator for displacing the focal point of read light in the direction perpendicular to the disc surface by displacing an objective lens which is, for example, a read light radiating optical system and which determines its focal point in the optical axial direction. An acceleration signal as a focus jump activation signal for moving the focal point of the read light to a target recording surface is supplied to the focusing actuator at the initial stage of the focus jumping operation. Based on the timing of a zero-crossing point which is sequentially detected from the focusing error signal obtained during the displacement of the focusing actuator in response to the acceleration signal, a series of operations for finishing the supply of the acceleration signal, supplying a deceleration signal to stop the displacement of the focusing actuator in response to the acceleration signal to the focusing actuator and, further, finishing the supply of the deceleration signal and restarting a focusing servo to the target recording surface is executed.

FIG. 1 shows a relationship between a position in a disc internal layer of a focal point P of read light which is determined by an objective lens 100 and a level FE of a focusing error signal obtained when the focal point P is moved in an optical axial direction. It will be understood that the focusing error signal basically shows the zero level (zero-crossing points ZC00 and ZC10) in a state where the focal point P is on the recording surface and draws an S-shaped curve around a zero level as the center. A period from the minimum value to the maximum value of one S-shaped curve substantially corresponds to a control range of a focusing servo loop which is formed. Since the supply control of the acceleration signal and deceleration signal is executed during the focal point movement between one recording surface and another recording surface, it is performed on the basis of detection timings of zero-crossing points ZC00, ZC01, ZC1-1, and ZC10 of the focusing error signal as shown in the diagram.

The focusing error signal obtained during the movement of the focal point between the recording surfaces is, however, influenced by defects on the surface or the recording surface of the disc or on the surface of the other internal layer, an improper formation mark which is equivalent to the defects (hereinafter, referred to as defects, generally), or a crosstalk. Specifically, when the defect position is scanned by the read light or the crosstalk occurs, the level of the generated focusing error signal remarkably drops or sharply increases. There is, therefore, a possibility that the focusing error signal shows what is called a pseudo zero-crossing point different from a desired zero-crossing point by the S-shaped curve shown in FIG. 1. In this case, the supply control of the acceleration signal and deceleration signal cannot be correctly executed, the focusing actuator is consequently erroneously operated, and a focus jumping operation fails.

Hitherto, since the focus jumping operation is executed even when a drop-out occurs in a read signal and even when a vibration occurs in the disc or the player, the jumping operation often fails. This type of failure of the jumping operation occurs irrespective of the above-mentioned defects and the detection of zero-crossing.

SUMMARY AND OBJECTS OF THE INVENTION

The invention is made in consideration of the above drawbacks and it is an object to provide a focusing control apparatus which can certainly perform a sucessful focus jumping operation.

According to the invention, there is provided a focusing control apparatus comprising: reading means for irradiating read light to a recording medium having information recording surfaces formed on at least two layers, respectively, receiving return light of the read light from the recording medium, and generating a read signal; and control means for executing a focus jumping process to generate a drive signal of a focusing actuator to move an optimum light converging position of the read light from one of the recording surfaces to the other on the basis of a focusing error signal which is generated on the basis of the return light, wherein the apparatus further has drop-out detecting means for detecting a drop-out of the read signal and the control means executes the focus jumping process only when the drop-out is not detected.

According to the invention, there is provided a focusing control apparatus comprising: reading means for irradiating read light to a recording medium having information recording surfaces formed on at least two layers, respectively, receiving return light of the read light from the recording medium, and generating a read signal; and control means for executing a focus jumping process to generate a drive signal of a focusing actuator to move an optimum light converging position of the read light from one of the recording surfaces to the other on the basis of a focusing error signal which is generated on the basis of the return light, wherein the apparatus further has vibration detecting means for detecting a vibration of the recording medium or the reading means and the control means executes the focus jumping process only when a vibration detection level of the vibration detecting means is lower than a predetermined value.

According to the invention, there is provided a focusing control apparatus comprising: reading means for irradiating read light to a recording medium having information recording surfaces formed on at least two layers, respectively, receiving return light of the read light from the recording medium, and generating a read signal; and control means for executing a focus jumping process to generate a drive signal of a focusing actuator to move an optimum light converging position of the read light from one of the recording surfaces to the other on the basis of a focusing error signal which is generated on the basis of the return light, wherein the apparatus further has drop-out detecting means for detecting a drop-out of the read signal and vibration detecting means for detecting a vibration of the recording medium or the reading means and the control means executes the focus jumping process only when the drop-out is not detected and when a vibration detection level of the vibration detecting means is lower than a predetermined value.

The control means can be constructed so as to execute the focus jumping process by: detecting means for detecting a fact that the focusing error signal has passed the predetermined level as a specific level crossing; instructing means for generating a focus jump instruction; drive signal generating means for starting the generation of the drive signal in response to the focus jump instruction, receiving a detection output of the detecting means, recognizing a specific level crossing detection timing of the focusing error signal by the reception of the detection output, and extinguishing the drive signal in response to the specific level crossing detection timing; and inhibiting means for inhibiting the recognition of the specific level crossing detection timing in the drive signal generating means for a predetermined period in response to the focus jump instruction.

The vibration detecting means can be constructed by comprising means for detecting a level of a predetermined frequency component of the focusing error signal as a vibration detection level.

It is preferable to construct the control means so as to execute the focus jumping process after the elapse of a predetermined time since the vibration detection level of the vibration detecting means becomes lower than the predetermined value.

BRIEF DESCRIPTION OF THE DRAWINGS

FIGS. 4A to 4I are time charts showing a waveform shown by an output of each section of a focusing control apparatus in the focus jumping operating process in FIG. 3;

FIGS. 5A to 5H are time charts showing a waveform shown by the output of each section of the focusing control apparatus in the focus jumping operation in the case where there is not a function to mask a zero-crossing point of a focusing error signal;

FIG. 8 is a block diagram showing a specific construction of a drop-out detecting circuit in the player of FIG. 7;

FIGS. 9A to 9C are time charts showing an output waveform in each section in the drop-out detecting circuit in FIG. 8;

DETAILED DESCRIPTION OF THE PREFERRED EMBODIMENT

An embodiment of the invention will now be described in detail hereinbelow with reference to the drawings.

Figure 2:
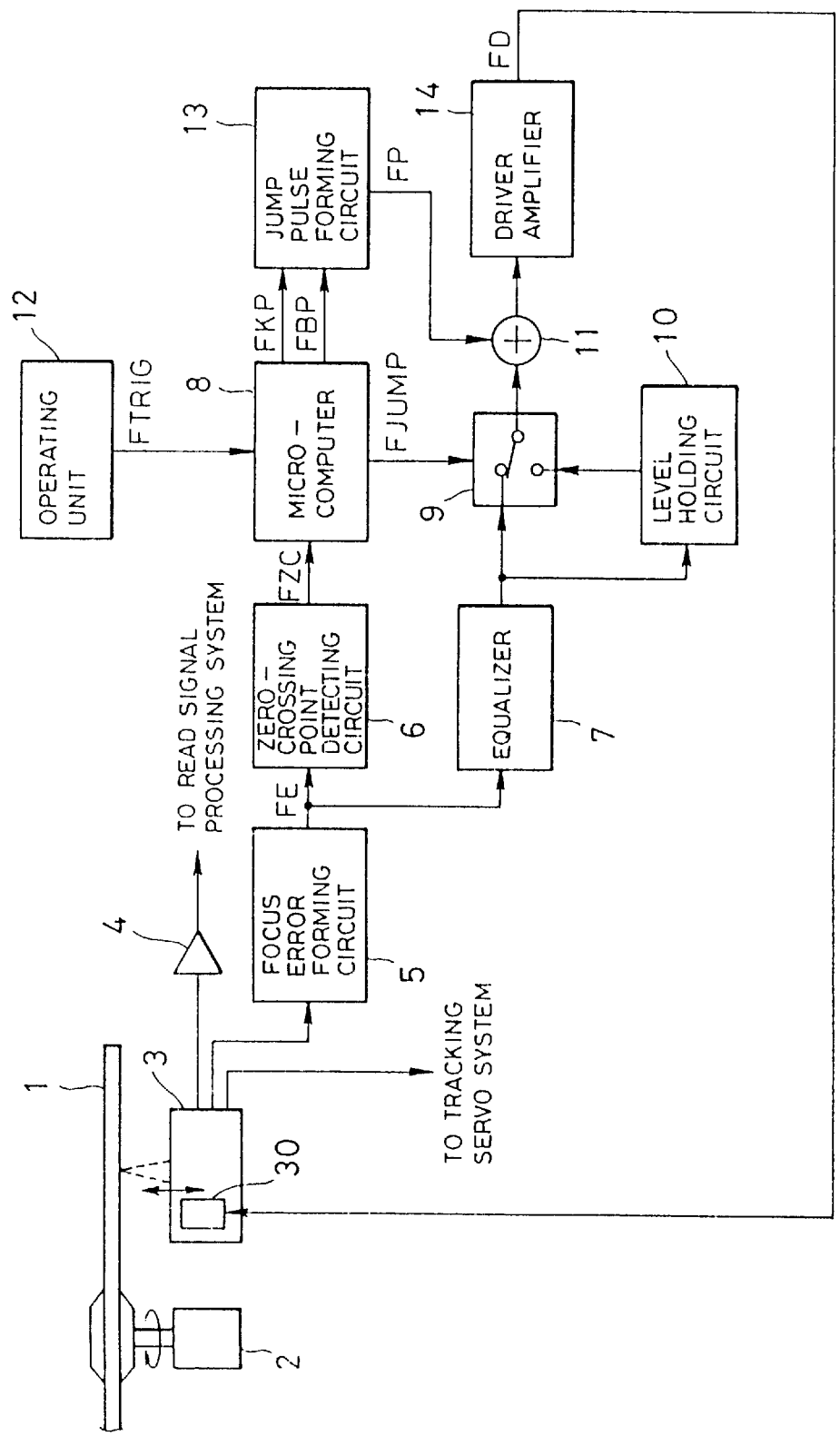
FIG. 2 is a block diagram schematically showing the construction of an optical disc player for explaining the basic focus jumping operation in the invention.

FIG. 2 schematically shows the construction of an optical disc player for explaining a basic focus jumping operation in the invention.

In FIG. 2, a disc 1 loaded in the player is rotated by a spindle motor 2. Read light emitted from a pickup 3 is irradiated onto the rotating disc 1. The read light reaches a recording surface through a protecting layer of the disc 1, is modulated by what is called a recording mark which indicates recording information and is a pit or the like formed on the recording surface, and is returned to the pickup 3 as reflection light from the recording surface.

The pickup 3 not only emits the read light but also executes a photoelectric conversion for receiving the reflection light from the disc 1 and generating various electric signals according to a light amount and/or a state of the reflection light. Among the electric signals generated from the pickup 3, a read signal (what is called an RF (Radio Frequency) signal) mainly having a signal component according to the recording information of the disc 1 is amplified by an RF amplifier 4 and, after that, it is transmitted to a read signal processing system (not shown). The read signal processing system reproduces a final audio or video signal or computer data signal from the RF signal and transfers the reproduction signal to, for example, an outside of the player.

On the basis of the other electric signals generated from the pickup 3, a focusing error forming circuit 5 forms the focusing error signal FE for the recording surface of the read light. Further the other electric signals generated from the pickup 3 are supplied to a tracking servo system (not shown). In the tracking servo system, a tracking error signal is formed on the basis of the electric signals. In accordance with the tracking error signal, the irradiating position of the read light is controlled so as to coincide with the center of the recording track of the disc.

An example of an embodiment of forming the focusing error signal will now be mentioned. As a photo-sensing system of the pickup 3, there is a construction such that the reflection light from the disc is transmitted through a cylindrical lens, an astigmatism is given to the reflection light, and the transmitted reflection light is received by a 4-split photodetector. A photo-sensing surface of the 4-split photodetector has four photo-sensing portions divided by two straight lines which perpendicularly cross at the center of the photo-sensing surface. Based on a principle such that the received reflection light changes a shape and an intensity on the photo-sensing surface in accordance with the focal state of the read light for the recording surface of the disc, photoelectric conversion signals of the photo-sensing portions which are point symmetrically located with respect to the photo-sensing center are added. A signal according to a difference between two addition signals which are thus obtained is generated as a focusing error signal.

In an example of an embodiment of forming the read signal, in case of using the 4-split photodetector, although the read signal can be derived from the sum of the photoelectric conversion signals of all of the photo-sensing portions, it can be also obtained from another detector.

Although there is a 3-beam method as a method of forming the tracking error signal, in case of obtaining a tracking error by a single light beam, there is also a method called a phase difference method or a push-pull method.

The pickup 3 has therein a focusing actuator 30 to move an objective lens, in its optical axial direction, for irradiating the read light emitted from the light source onto the disc 1. The focusing actuator 30 displaces the objective lens in the direction perpendicular to the surface of the disc 1 in accordance with a level and a polarity of a drive signal, which will be explained later.

The focusing error signal FE is supplied to a zero-crossing point detecting circuit 6 and an equalizer 7. The zero-crossing point detecting circuit 6 detects that a level of the focusing error signal FE is at a predetermined level, namely, that it has passed through the zero level in the embodiment, generates a zero-crossing detection signal FZC according to its detection result, and supplies to a microcomputer 8. A detailed detection principle of the zero-crossing point detecting circuit 6 and a detailed form of the zero-crossing detection signal FZC will be described later.

The equalizer 7 executes a waveform equalizing process to the supplied focusing error signal FE and supplies the equalized focusing error signal to a selector 9 and a level holding circuit 10. Equalizing characteristics of the equalizer 7 can be changed by an instruction signal from the microcomputer 8. In accordance with a jump status signal FJUMP from the microcomputer 8, the selector 9 selectively transfers either one of the focusing error signal from the equalizer 7 and an output signal of the level holding circuit 10 to an adder 11 at the post stage. In more detail, the selector 9 supplies the output signal of the level holding circuit 10 to the adder 11 only when the jump status signal FJUMP indicates a jump operating state. In the other cases, the selector 9 supplies the focusing error signal from the equalizer 7 to the adder 11.

The level holding circuit 10 holds the level of the focusing error signal from the equalizer 7 just before the jumping operation at the focal position of the read light and supplies a signal to form the initial level of a focusing actuator drive signal FD during the jumping operation (while a focusing servo loop is open) to the selector 9. The details of the level holding circuit 10 will be explained later.

Although the microcomputer 8 executes various controls and processes in the player, with respect to the operation to jump the focal position of the read light from one recording surface to the other recording surface (hereinafter, abbreviated to a jumping operation), the microcomputer 8 executes a process corresponding to the jump operating mode in response to a jump instruction signal from an operating unit 12 serving as instructing means. In the jump operating mode, on the basis of the zero-crossing detection signal FZC, the microcomputer 8 generates a kick pulse FKP to accelerate the focusing actuator 30 so as to be displaced in a predetermined direction, a brake pulse FBP to decelerate the focusing actuator 30 during the displacement by the kick pulse so as to stop the displacement in the predetermined direction, and the jump status signal FJUMP. Both of the pulse FKP and FBP are supplied to a jump pulse forming circuit 13. The status signal FJUMP is supplied to a control input terminal of the selector 9.

On the basis of the kick pulse FKP and brake pulse FBP, the jump pulse forming circuit 13 synthesizes those pulses while giving corresponding polarities thereto, forms a jump pulse FP, and supplies to the adder 11.

The adder 11 adds a signal from the selector 9 and the jump pulse FP and supplies an addition output to a driver amplifier 14. The driver amplifier 14 generates a drive signal according to an output of the adder 11 and supplies to the focusing actuator 30. At the time of the closure of the focusing servo loop in which the selector 9 relays the output signal of the equalizer 7, consequently, the focusing actuator 30 is driven so that the level of the focusing error signal FE is equal to zero, namely, the focal position of the read light traces the recording surface. At the time of the opening of the focusing servo loop in which the selector 9 relays the output signal of the level holding circuit 10, on the other hand, the focusing actuator 30 is driven so that the focal position of the read light is forcibly moved to the target recording surface in accordance with the jump pulse FP.

A focus jumping process which is executed by the microcomputer 8 and the contents of the operation of each section responsive thereto will now be described.

Figure 3:
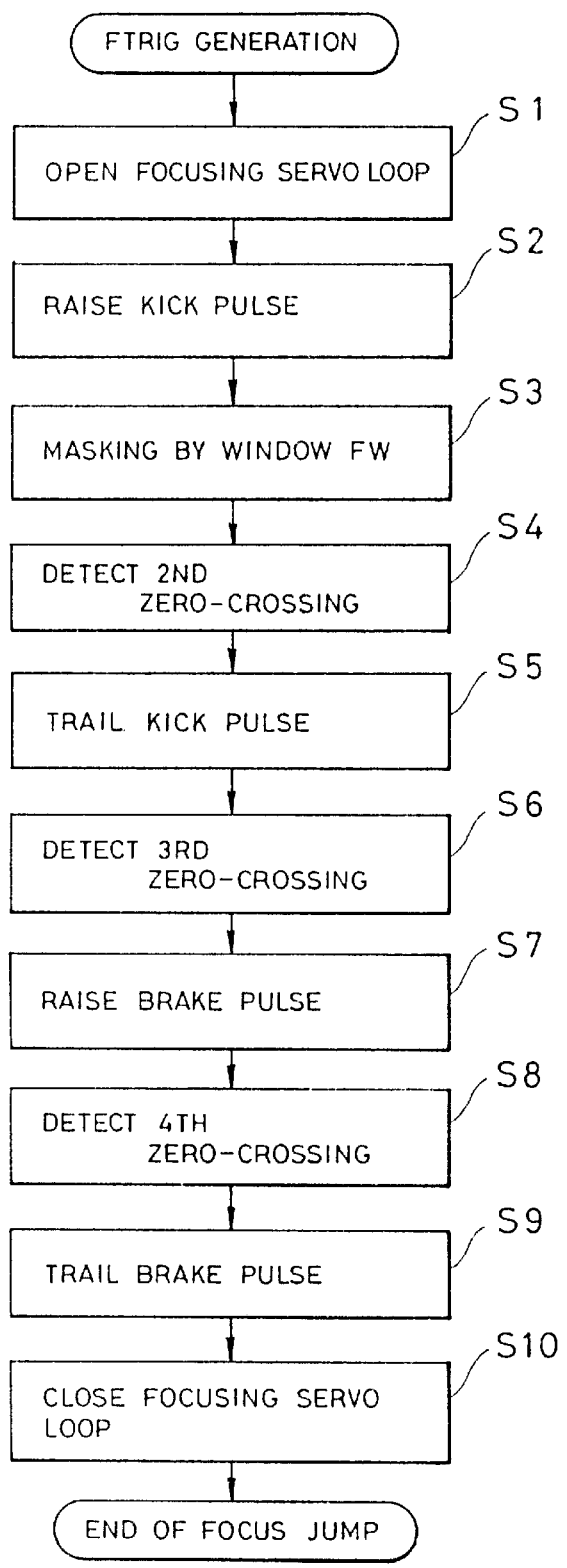
FIG. 3 is a flowchart showing a procedure for a focus jumping operating process which is executed by a microcomputer in the player of FIG. 2.

FIG. 3 shows a procedure of the focus jumping process. FIGS. 4A to 4I show a waveform of an output signal in each section in FIG. 2.

When a focus jump instruction signal FTRIG to move the focal position of the read light to the other recording surface is received from the operating unit 12, the microcomputer 8 interrupts the process which has been being executed so far and first opens the focusing servo loop (step S1). Specifically speaking, there is performed a control such that by setting the jump status signal FJUMP to the high level, the selector 9 relays the output signal of the level holding circuit 10 to the adder 11 in place of the focusing error signal from the equalizer 7. The microcomputer 8 sets the kick pulse FKP to the high level (step S2).

Since the jump pulse forming circuit 13, consequently, forms the jump pulse FP having the high level of the positive polarity corresponding to the kick pulse, the adder 11 generates an addition output of the level obtained by adding the high level of the positive polarity shown by the jump pulse FP and the holding level which is transmitted from the level holding circuit 10 through the selector 9. The drive signal FD corresponding to the addition output is supplied from the driver amplifier 14 to the focusing actuator 30. In the generation period of time of the kick pulse FKP, therefore, the actuator 30 is forcibly accelerated in such a direction as to move the focal position of the read light to the new target recording surface. In association with it, the focusing error signal FE shows a valley-shaped changes such that the absolute value of the level increases as the focal position of the read light is away from the recording surface where it has been tracing so far and, after passing through the minimum value (see Vmin in FIG. 4B), it is returned to the zero level.

In response to the leading of the kick pulse, the microcomputer 8 activates a window timer which is formed in its internal circuit or a program and starts to count a predetermined time $t_w$ from the leading edge of the kick pulse or status signal FJUMP (step S3). In FIG. 4E, the counting operating state is shown by a pulse waveform FW at the high level.

For the predetermined time $t_w$ by the window timer, even if the zero-crossing detection signal FZC is received from the zero-crossing point detecting circuit 6, the microcomputer 8 does not respond to it. In more detail, even if not only the trailing edge of the zero-crossing detection signal FZC but also the leading edge reaches, they are not counted. For the predetermined time $t_w$, therefore, the masking of the trailing edge and leading edge of the zero-crossing detection signal FZC serving as zero-crossing detection timings is performed. For the predetermined time $t_w$, consequently, at least a zero-crossing point ZC1 as shown in FIG. 4B is ignored.

When the window timer counts the predetermined time $t_w$, the microcomputer 8 releases the masking, monitors the zero-crossing detection signal FZC, and detects its leading edge (step S4). When the level of the focusing error signal FE changes from a level near the zero level to the minimum value Vmin, the masking for the predetermined time $t_w$ is performed over the first zero-crossing detection point ZC1. The microcomputer 8, therefore, detects a second zero-crossing point ZC2, namely, the leading edge instead of the trailing edge of the zero-crossing detection signal FZC in step S4.

The zero-crossing point detecting circuit 6 detects the zero-crossing of the focusing error signal FE as follows. That is, as for the negative polarity level of the focusing error signal FE, when the level transverses a predetermined threshold value −Vth, the occurrence of the zero-crossing is detected. With respect to the positive polarity level of the focusing error signal FE, when the level transverses a predetermined threshold value +Vth, the occurrence of the zero-crossing is detected. As absolute values of the threshold values −Vth and +Vth, values such that it can be determined that the focusing error signal FE is largely away from a level near the zero level and that the focusing error signal FE reaches a level that is sufficiently close to the zero level from a relatively large absolute value level are set. Actually, it is detected that the focusing error signal FE passes through a predetermined voltage region.

When the second zero-crossing point ZC2 is detected in step S4, the microcomputer 8 trails the kick pulse FKP (step S5). The jump pulse forming circuit 13, consequently, trails the output jump pulse FP to the zero level, so that the adder 11 obtains an addition output of the level obtained by adding the zero level shown by the jump pulse FP and the holding level which is transmitted from the level holding circuit 10 through the selector 9, accordingly, the output level of the level holding circuit 10. In association with it, the drive signal FD whose level rapidly dropped is supplied from the driver amplifier 14 to the focusing actuator 30. Since there is, however, an inertia moment of the driving by the kick pulse FKP generated before, the focusing actuator 30 continues the displacement for moving the focal position of the read light to the target recording surface although the velocity is reduced.

Figure 1:
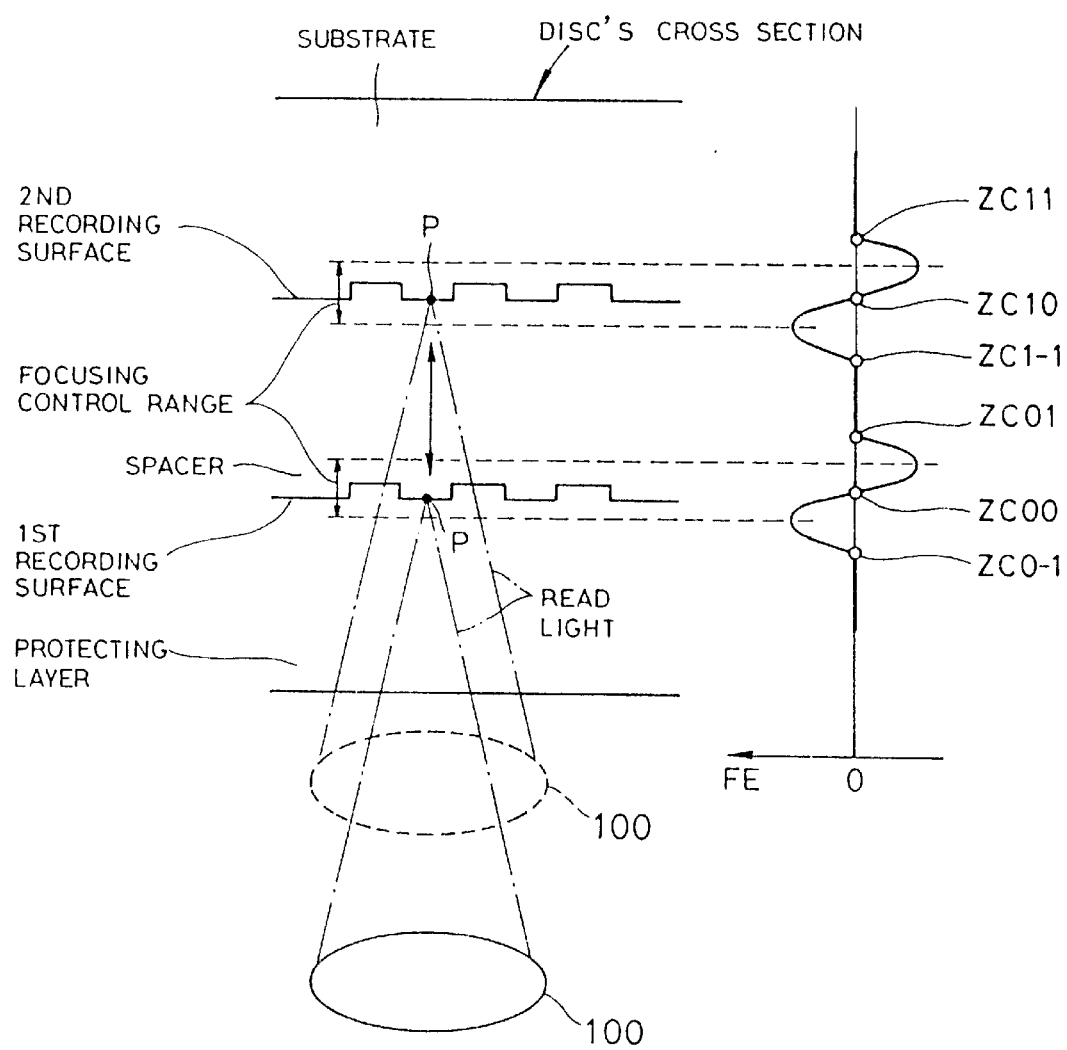
FIG. 1 is a diagram showing a relation between the position in a disc internal layer of a focal point of read light in an ordinary focus jumping operation and a level of a focusing error signal which is derived when the focal point is moved in the optical axial direction.

After that, the microcomputer 8 monitors the zero-crossing detection signal FZC and detects its trailing edge (step S6). This process corresponds to the detection of a third zero-crossing point ZC3. Before the focusing error signal FE enters a focusing control range (refer to FIG. 1) for the target recording surface, the level exceeds the threshold value +Vth and the third zero-crossing point ZC3 is detected.

When the third zero-crossing point ZC3 is detected, the microcomputer 8 raises the brake pulse FBP (step S7). The jump pulse forming circuit 13, therefore, further reduces the output jump pulse FP to the low level of the negative polarity, so that the adder 11 supplies an addition output of the level obtained by adding the low level shown by the jump pulse FP and the holding level which is transmitted through the selector 9 from the level holding circuit 10 to the driver amplifier 14. In association with it, the drive signal FD to stop the movement of the read light focal position to the target recording surface so far is supplied to the focusing actuator 30. The focusing actuator 30 gradually decreases the displacement velocity.

In the decelerating step of the actuator, the microcomputer 8 monitors the zero-crossing detection signal FZC and detects its leading edge (step S8). This process corresponds to the detection of a fourth zero-crossing point ZC4. As the focal point of the read light approaches the target recording surface from the position corresponding to the third zero-crossing point ZC3, the level of the focusing error signal FE increases. After passing through the maximum value (refer to Vmax in FIG. 4B), the level contrarily gradually decreases and is set to the zero level when the focal point of the read light just reaches the target recording surface, so that the fourth zero-crossing point ZC4 is detected.

When the fourth zero-crossing point ZC4 is detected, the microcomputer 8 trails the brake pulse FBP (step S9), trails the jump status signal FJUMP, and closes the focusing servo loop (step S10). A control is made, consequently, in a manner such that the jump pulse forming circuit 13 raises the output jump pulse FP to the zero level and the selector 9 relays the focusing error signal from the equalizer 7 to the driver amplifier 14 through the adder 11. The focusing actuator 30, therefore, subsequently executes a stationary focusing servo operation for allowing the focal position of the read light to trace the target recording surface on the basis of the focusing error signal FE.

The focus jumping operation is finished in this manner and the microcomputer 8 shifts to, for example, a mode to reproduce the recording information of the target recording surface.

It is a feature of the focus jumping operation according to the embodiment that the control to finish the kick pulse for the predetermined time $t_w$ is not performed on the basis of the zero-crossing detection. Even if, therefore, the focusing error signal shows an abnormal zero-crossing due to some causes for the predetermined time $t_w$, the jumping operation to the target recording surface can be certainly made successful without erroneous finishing the kick pulse early.

To clearly explain the above operation and effect, an output waveform in each section in case of operating without performing the masking for the predetermined time $t_w$ is shown in FIGS. 5A to 5H. In this case, if the focusing error signal FE causes what is called a mustache-shaped level fluctuation due to a scratch, the zero-crossing detection signal FZC sequentially exhibits the trailing edge and leading edge in a short time in correspondence to it. The microcomputer side, therefore, finishes the kick pulse FKP by the leading edge of the zero-crossing detection signal FZC and starts to generate the brake pulse FBP by the trailing edge of the zero-crossing detection signal FZC which is soon generated after that. The drive signal FD which is obtained in this manner eventually has a waveform such that a pulse width of the kick pulse portion is extremely short and an interval between the kick pulse portion and the brake pulse portion is also extremely short. The focusing actuator 30 to which the drive signal is supplied cannot perform the displacement until the focal position of the read light reaches the target recording surface, so that the jumping operation fails.

On the other hand, according to the embodiment, since there is the masking of the predetermined time $t_w$ for inhibiting the recognition of the zero-crossing timing in the microcomputer 8, even if an abnormal zero-crossing due to a scratch or the like as shown in FIG. 5B occurs in the focusing error signal, it is ignored and the good jumping operation can be guided.

Although there is a possibility of the occurrence of a similar abnormal zero-crossing even at the fourth zero-crossing point ZC4 of the focusing error signal FE, even if the zero-crossing is erroneously detected here and the trailing timings of the jump status signal FJUMP and brake pulse FBP are deviated, the timing to close the focusing servo loop is merely made early, so that there is no large influence as a whole focus jumping operation. Since the focusing error signal FE between the second and third zero-crossing points ZC2 and ZC3 is obtained when the focal point of the read light moves between the first and second recording surfaces, the influence by a scratch or the like is sufficiently small.

The level holding circuit 10 will now be described in detail.

Figure 6:
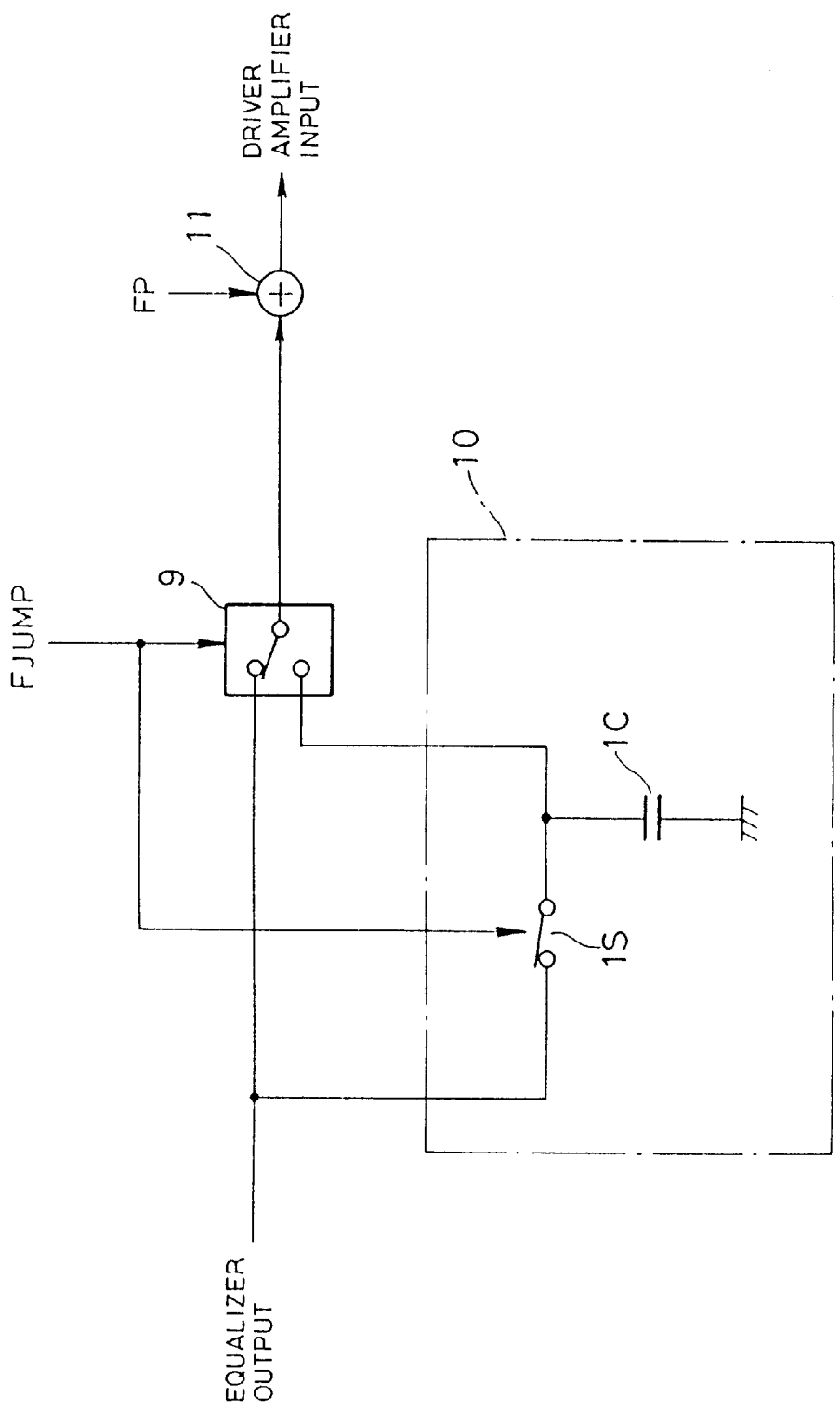
FIG. 6 is a block diagram showing the construction of a level holding circuit and its peripheral circuits in the player of FIG. 2.

FIG. 6 shows a specific example of the level holding circuit 10 and its peripheral construction. The level holding circuit 10 can be constructed by: a switching circuit 1S having an input terminal to which the output signal of the equalizer 7 is supplied and a control terminal to which the jump status signal FJUMP from the microcomputer 8 is supplied; and a capacitor 1C connected between an output terminal of the switching circuit 1S and a ground point. A signal of an output terminal line of the switching circuit 1S is supplied as an output of the level holding circuit to a non-selection input terminal of the selector 9.

In the level holding circuit 10, when the jump status signal FJUMP is at the low level, namely, when the focusing servo loop is closed, the switching circuit 1S is closed and a voltage according to the equalizer output signal is held in the capacitor 1C. In this case, since the selector 9 selects the equalizer output, the equalizer output signal is supplied as it is to the adder 11.

On the other hand, when the jump status signal FJUMP is at the high level, namely, when the focusing servo loop is open, the switching circuit 1S is opened and a charged voltage by the equalizer output signal held in the capacitor 1C just before is held. Since the selector 9 selects the output of the holding circuit 10 in this instance, the holding voltage is supplied to the adder 11.

It is a role of the level holding circuit 10 to cope with a vibration (surface oscillation) of the disc in the direction perpendicular to the surface of the disc 1 which is rotated. That is, if there is such a vibration, since this means that the recording surface in the disc 1 also vibrates in the perpendicular direction, the focusing error signal also exhibits the level fluctuation according to this vibration. In case of performing the focus jumping operation under the vibration, if the focusing actuator is driven as it is by the fixed voltage level by the kick pulse, so long as the vibration is particularly large, a possibility of the occurrence of a situation where the focal position of the read light cannot be moved until the pickup reaches a position near the target recording surface or a situation where the focal position of the read light is contrarily excessively moved beyond the target recording surface is large.

In the embodiment, therefore, by providing the level holding circuit 10, when the focusing actuator 30 is driven by the kick pulse, the voltage level corresponding to the vibration component included in the focusing error signal so far is added to the voltage level by the kick pulse and the drive signal of the focusing actuator is formed, thereby absorbing the vibration.

According to the embodiment of the focus jump described above, the focus jumping operation itself is improved and the acceleration signal (kick pulse) and deceleration signal (brake pulse) as focusing actuator drive signals which are required for the focus jumping operation are correctly generated. In the embodiment according to the invention, which will be explained later, however, by performing the focus jumping operation at a proper timing, a success ratio of the focus jumping operation is improved.

Figure 7:
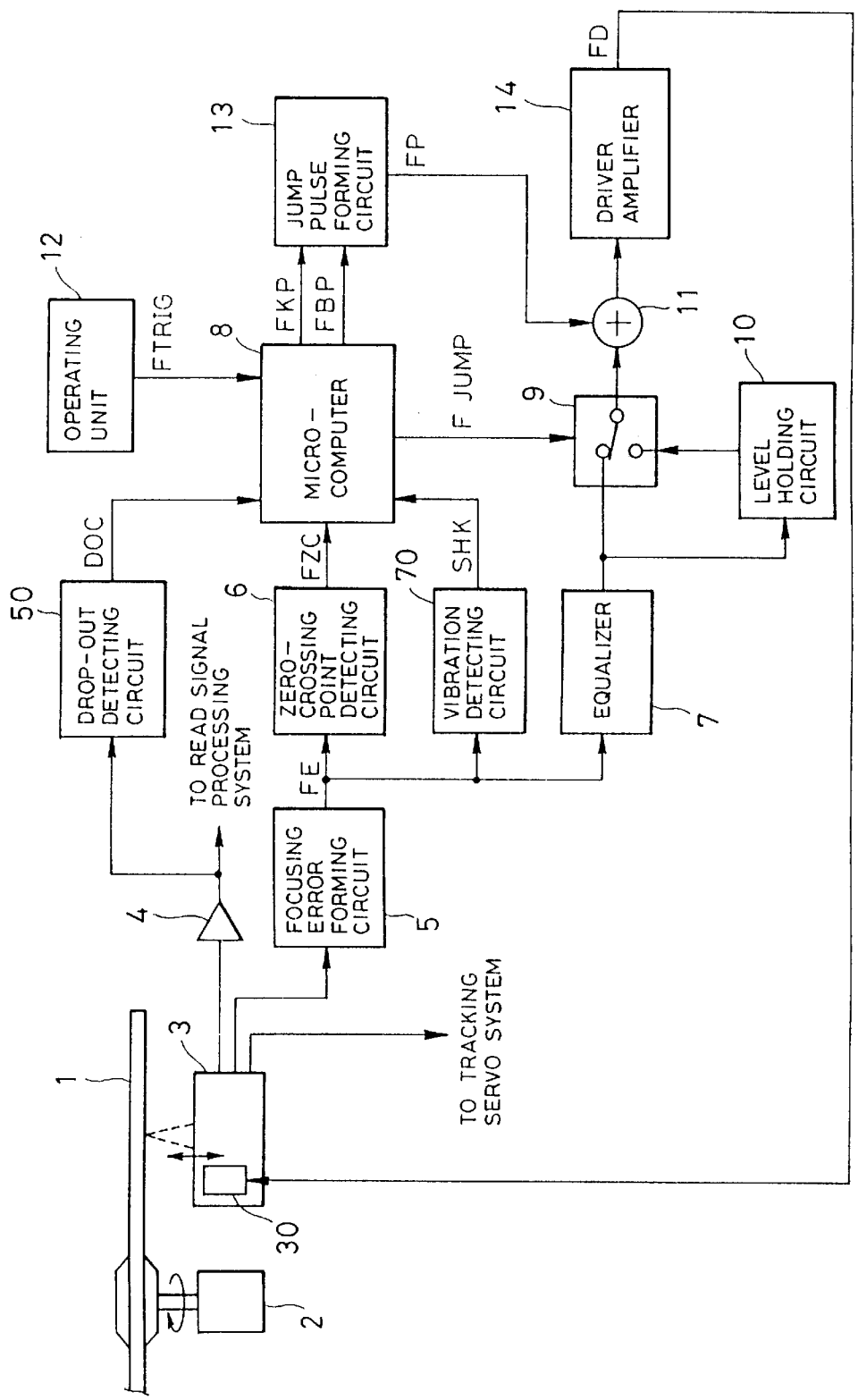
FIG. 7 is a block diagram schematically showing the construction of an optical disc player to which the focusing control apparatus of an embodiment according to the invention is applied.

FIG. 7 shows a schematic construction of the optical disc player to which the focusing control apparatus of the embodiment is applied and differs from the construction of FIG. 2 with respect to a point that a drop-out detecting circuit 50 and a vibration detecting circuit 70 are provided.

The RF signal (read signal) from the RF amplifier 4 is supplied to the drop-out detecting circuit 50. The drop-out detecting circuit 50 detects a drop-out of the RF signal, generates a detection signal DOC according to its detection result, and sends it to the microcomputer 8. The "drop-out" in case of reading the optical disc denotes a phenomenon such that the photo-sensing output signal and RF signal waveform in the pickup are locally deformed due to a drop-out of pits to be recorded (formed) on the disc, a scratch or fingerprint on the disc surface, a drop-out of the reflecting film forming the recording surface, or the like. When the drop-out occurs, the information signal cannot be reproduced from the RF signal or noises are superimposed to the focusing error signal which is formed on the basis of the photo-sensing output signal.

FIG. 8 shows a specific construction of the drop-out detecting circuit 50. The drop-out detecting circuit 50 is constructed by: first and second peak detecting circuits 51 and 52 for receiving the RF signal, respectively; and a comparator 53 for comparing levels of output signals of the detecting circuits and generating the detection signal DOC according to its comparison result.

The first peak detecting circuit 51 detects the peak of the RF signal by a predetermined time constant. As shown in FIGS. 9A and 9B, it shows a detection output D1 of a waveform almost along the upper side envelope of the RF signal. The second peak detecting circuit 52 detects the peak of the RF signal by a time constant larger than the time constant for detection in the first peak detecting circuit 51. As shown in FIG. 9B, it shows a detection output D2 having a level fluctuation which is fairly gentle in the peak fluctuation of the RF signal than the detection output D1. The comparator 53 compares levels of the detection outputs D1 and D2 and generates the detection signal DOC at the high level for a period of time while the level of the detection output D1 is lower than that of the detection output D2 as shown in FIG. 9C.

Figure 10:
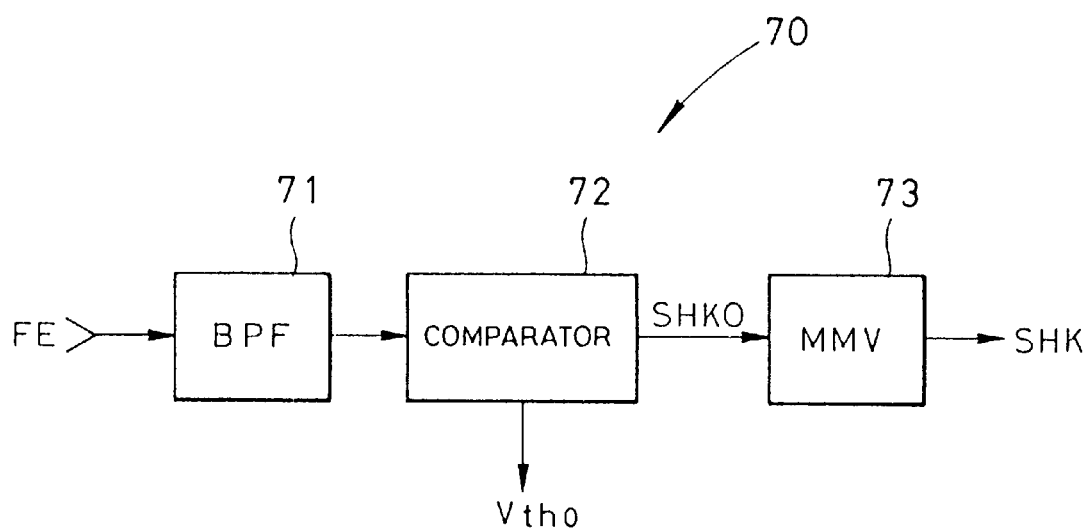
FIG. 10 is a block diagram showing a specific construction of a vibration detecting circuit in the player of FIG. 7.

The vibration detecting circuit 70 detects a vibration of the disc 1 or player on the basis of the focusing error signal FE, generates a detection signal SHK according to its detection result, and supplies it to the microcomputer 8. FIG. 10 shows its specific construction. The vibration detecting circuit 70 is constructed by: a band pass filter (BPF) 71 to which the focusing error signal FE is supplied; a comparator 72 for comparing an output signal of the BPF with a predetermined threshold value Vth0; and a retriggerable monostable multivibrator (MMV) 73 for receiving a comparison output of the comparator as a trigger input and generating the detection signal SHK from its output.

The BPF 71 are set to characteristics for passing frequency components before and after a predetermined value of 20 Hz, for example, passing characteristics of 1 Hz to 1 kHz. The reason why 20 Hz is used as a predetermined value of the BPF 71 is generally because the disc 1 and player are likely to vibrate at a frequency near 20 Hz and the level of the focusing error signal FE fluctuates due to the vibration as a disturbance, and it is necessary to accurately extract the disturbance component of the focusing error signal FE. Particularly, in case of a damper for vibration prevention provided for the player, a vibration proof property near 20 Hz is low. By setting 20 Hz to a target of a passing band of the BPF 71, the disturbance component which largely exerts an influence on the focusing error signal can be accurately extracted.

Figure 11:
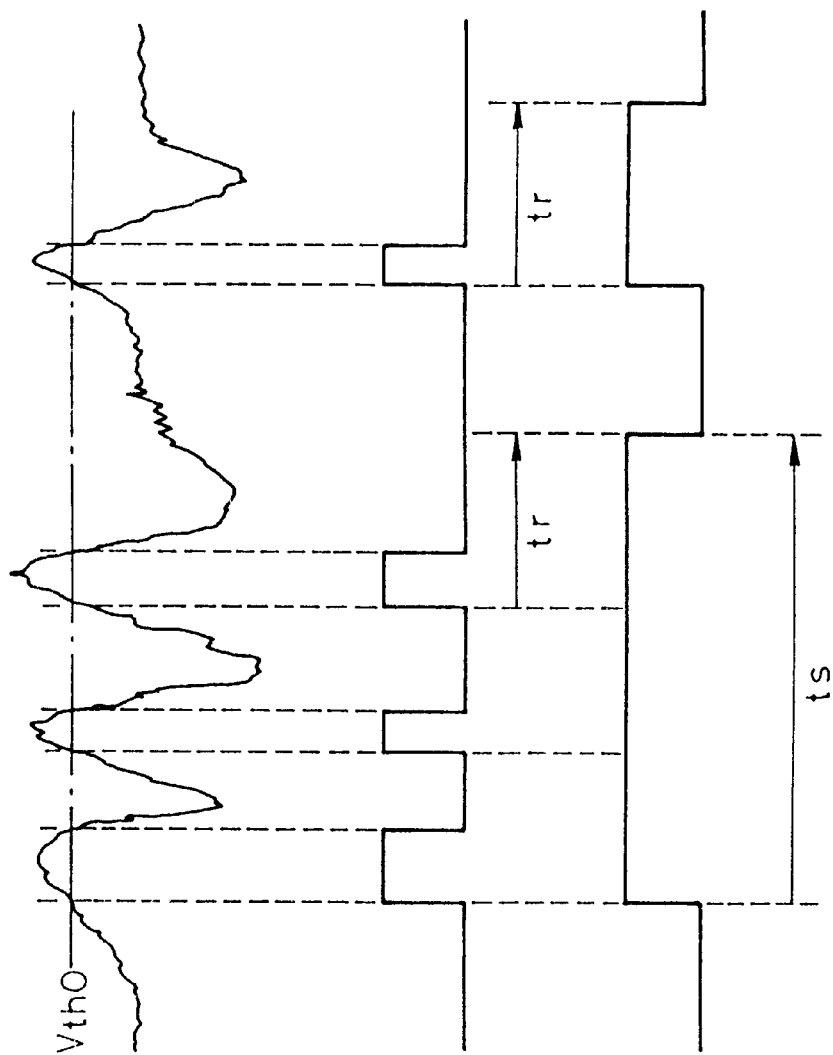
FIGS. 11A to 11C are time charts showing an output waveform in each section in the vibration detecting circuit in FIG. 10.

From an output of the BPF 71 set as mentioned above, for example, a signal whose level fluctuates according to the disturbance as shown in FIG. 11A is derived. This signal is compared with the threshold value Vth0 by the comparator 72. The comparator 72 generates a comparison output signal SHK0 which is set to the high level when the BPF output exceeds the threshold value Vth0 (FIG. 11B). The MMV 73 raises the output signal in response to the leading edge of the comparison output signal SHK0 and holds the output signal at the high level for a set time $t_r$ from the edge timing. When a leading edge of the comparison output signal SHK0 is newly generated for a period of time while the output signal is held at the high level, the MMV 73 again generates the output signal at the high level for a period of time from this timing to the set time $t_r$.

If the fluctuation such that the BPF output continuously exceeds the threshold value Vth0 successively occurs many times for a relatively short time as shown in FIG. 11A, the MMV 73 can perform a trigger before the elapse of the set time $t_r$ each time the signal exceeds the threshold value. The output signal SHK, therefore, continuously keeps the high level for a long time $t_s$ until the end of the last fluctuation after the occurrence of the first fluctuation exceeding the threshold value (FIG. 11C). As shown on the right side in FIG. 11A, when the BPF output solely exceeds the threshold value Vth0 and fluctuates, the output signal SHK which is at the high level for just the set time $t_r$ from the detection time point of the fluctuation is obtained. As mentioned above, the vibration detecting circuit 70 generates the output signal SHK which is set to the high level for at least the set time $t_r$ from the occurrence of the fluctuation such that the BPF output exceeds the threshold value.

By setting the set time $t_r$ to a value within a range from 50 to 100 [msec], a good result is derived. Although the threshold value Vth0 has a positive value, a negative threshold value can be also used in place of it or both of the positive and negative threshold values are used and their levels can be also compared.

The microcomputer 8 receives the foregoing drop-out detection signal DOC and shock detection signal SHK and executes a process to perform a series of focus jumping operations in steps S1 to S10 shown in FIG. 3 at proper timings.

Figure 12:
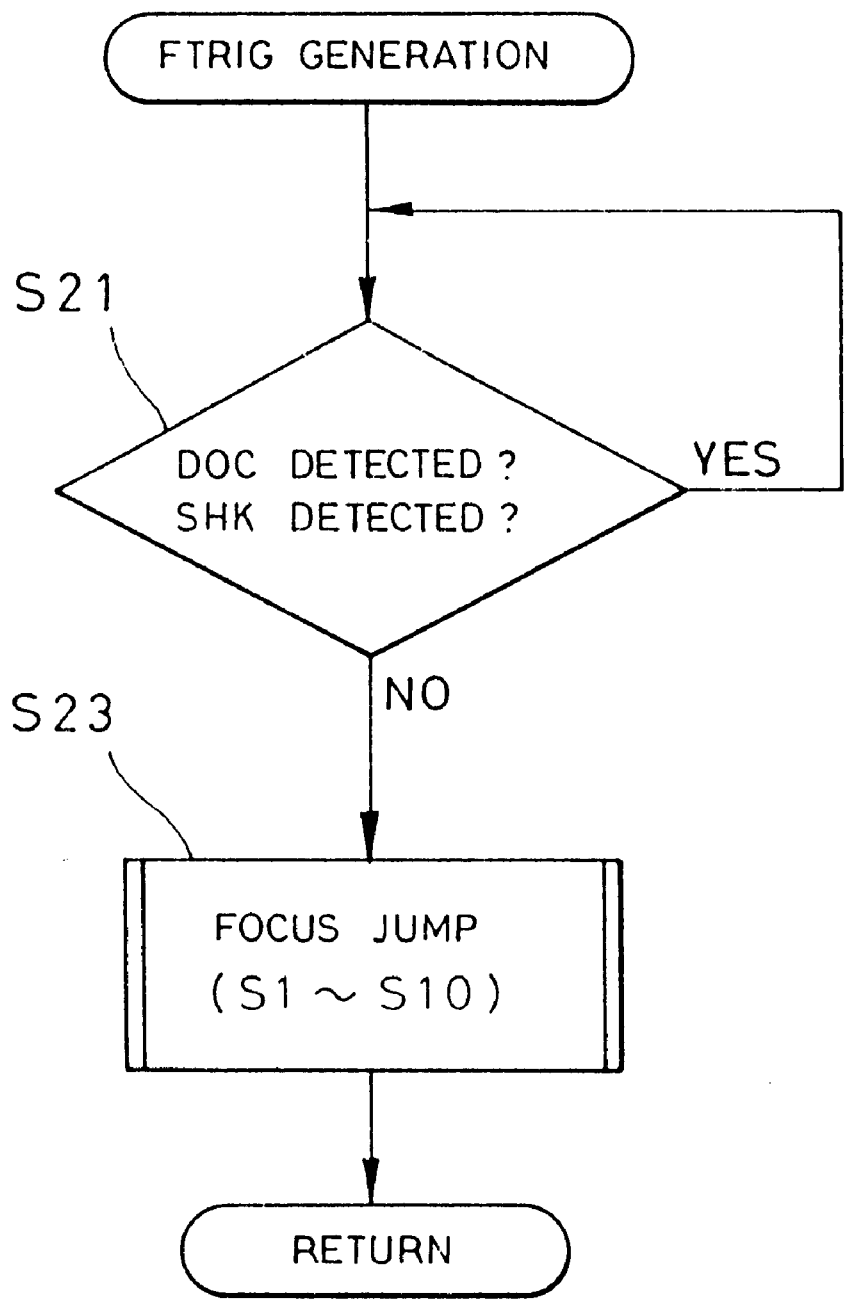
FIG. 12 is a flowchart showing the details of a timing process of a focusing servo operation which is executed by a microcomputer in the player of FIG. 7.

FIG. 12 shows a timing process of the focus jumping operation as mentioned above. When the focus jump instruction signal FTRIG to move the focal position of the read light to the other recording surface is received from the operating unit 12, the microcomputer 8 interrupts the process which has been being executed so far and monitors the detection signal DOC from the drop-out detecting circuit 50 and the detection signal SHK from the vibration detecting circuit 70 (step S21). When at least one of the detection signals DOC and SHK is at the high level, the microcomputer 8 enters a standby mode. When both of them are at the low level, the processing routine advances to step S23 to execute a process for the actual focus jumping operation. A state where both of the detection signals DOC and SHK are at the low level corresponds to a case where none of the drop-out and the large vibration occurs. Only in this case, the microcomputer starts the focus jumping operation.

In step S23, the processes in steps S1 to S10 shown in FIG. 3 are executed. The focus jumping operation, therefore, is executed in a state where none of the drop-out and the large vibration occurs.

Even if substantially the same processes as those in steps S1 to S10 are not executed, the advantages peculiar to the embodiment can be effected. In other words, in the focus jumping process in steps S1 to S10, although the zero-crossing of the focusing error signal is masked, if the ordinary focus jumping operation in which the masking is not performed is merely performed for the first time after completion of steps S21 and S22, a success ratio of the focus jumping operation is remarkably improved.

The reason why the vibration detecting circuit 70 keeps the detection signal SHK at the high level for a relatively long time of the set time $t_r$ after the occurrence of the fluctuation exceeding the threshold value of the BPF output is to cope with a periodic vibration of the disc and player. That is, this is because it is considered that the vibration continues for a little while after the occurrence thereof and if the focus jumping operation is executed for this period of time, a possibility that only an unstable focusing error signal is derived is large. In the embodiment, therefore, even if the signal is lower than the threshold value of the BPF output, the detection signal SHK is held at the high level for a little while, thereby preventing the focus jumping operation from being executed.

On the contrary, the DOC detection signal is held at the high level for only a period of time while the drop-out actually occurs. This is because even if the focus jumping operation is executed immediately after the elapse of the drop-out, the time which is required for the focus jumping operation is enough short and the jump can be completed before the next drop-out periodically occurs. That is, this is because the time that is required for the focus jump is sufficiently shorter than the period of the drop-out.

In the description so far, although the focus jumping operation in one direction has been described. In case of the focus jumping operation in the opposite direction, the polarity of the S-shaped curve of the focusing error signal FE is opposite and the driving direction of the focusing actuator is also reversed. It is, therefore, sufficient to generate a kick pulse, a brake pulse, and a jump status signal corresponding to them.

Although the DVD of the double-layer recording type has been mentioned in the embodiment, the invention is not limited to this type of DVD but can be also applied to a disc in which information recording surfaces are formed in at least two layers.

Although the above embodiment has been described, it is needless to mention that various changes and modification of the embodiment will occur to those skilled in the art based on the teaching of the present invention.

According to the invention, a successful focus jumping operation is always performed as described above.

What is claimed is:

1. A focusing control apparatus comprising:

reading means for irradiating read light to a recording medium having information recording surfaces formed on at least two layers, respectively, receiving return light of the read light from said recording medium, and generating a read signal; and control means for executing a focus jumping process to generate a drive signal of a focusing actuator to more an optimum light converging position of said read light from one of said recording surfaces to the other on the basis of a detection signal which is generated on the basis of detecting zero crossing points of a focus error signal of said return light, wherein said apparatus further comprises drop-out detecting means for detecting a drop-out of said read signal, and said control means executes the focus jumping process only when said drop-out is not detected, said control means including an inhibiting means for inhibiting the focus jumping process.

2. An apparatus according to claim 1, wherein said control means executes said focus jumping process by:

detecting means for detecting a fact that said focusing error signal has passed the predetermined level as a specific level crossing;

instructing means for generating a focus jump instruction;

drive signal generating means for starting the generation of said drive signal in response to said focus jump instruction, receiving a detection output of said detecting means, recognizing a specific level crossing detection timing of said focusing error signal by the reception of said detection output, and extinguishing said drive signal in response to said specific level crossing detection timing; and inhibiting means for inhibiting the recognition of said specific level crossing detection timing in said drive signal generating means for a predetermined period in response to said focus jump instruction.

* * * * *

UNITED STATES PATENT AND TRADEMARK OFFICE
CERTIFICATE OF CORRECTION

PATENT NO. : 6,256,273 B1
DATED : July 3, 2001
INVENTOR(S) : Matsuda et al.

It is certified that error appears in the above-identified patent and that said Letters Patent is hereby corrected as shown below:

Column 13,
Line 11, delete the word "more" and insert -- move --.

Signed and Sealed this

Thirtieth Day of April, 2002

Attest:

JAMES E. ROGAN
*Attesting Officer*     *Director of the United States Patent and Trademark Office*